United States Patent
Chen et al.

(10) Patent No.: US 10,404,400 B2
(45) Date of Patent: Sep. 3, 2019

(54) OPTICAL TRANSPORT SYSTEM EMPLOYING DIRECT-DETECTION SELF-COHERENT RECEIVERS AND COMPATIBLE TRANSMITTERS

(71) Applicant: Alcatel-Lucent USA Inc., Murray Hill, NJ (US)

(72) Inventors: Xi Chen, Aberdeen, NJ (US); Chandrasekhar Sethumadhavan, Old Bridge, NJ (US); Peter J. Winzer, Aberdeen, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 42 days.

(21) Appl. No.: 15/581,578

(22) Filed: Apr. 28, 2017

(65) Prior Publication Data

US 2018/0294913 A1   Oct. 11, 2018

Related U.S. Application Data

(60) Provisional application No. 62/483,134, filed on Apr. 7, 2017.

(51) Int. Cl.
*H04B 10/40* (2013.01)
*H04J 14/02* (2006.01)
(Continued)

(52) U.S. Cl.
CPC .......... *H04J 14/0227* (2013.01); *H04B 10/40* (2013.01); *H04B 10/611* (2013.01); *H04J 14/002* (2013.01); *H04J 14/06* (2013.01)

(58) Field of Classification Search
CPC .. H04B 10/40; H04B 10/801; H04B 10/1143; H04B 10/611; G02B 6/4246;
(Continued)

(56) References Cited

U.S. PATENT DOCUMENTS 7,123,402 B1   10/2006   Doerr et al.
7,526,211 B2   4/2009    Mcnicol et al.
(Continued)

FOREIGN PATENT DOCUMENTS

WO   WO2016055118 A1   4/2016

OTHER PUBLICATIONS

"Fiber Optical Transmission Systems," www.springer.com, 2012 [retrieved on Apr. 13, 2017] Retrieved from the Internet: <URL: http://www.springer.com/cda/content/document/cda_downloaddocument/9783642210549-c2.pdf?SGWID=0-0-45-1246859-p174123873 (20 pages).
(Continued)

*Primary Examiner* — Ted M Wang
(74) *Attorney, Agent, or Firm* — Mendelsohn Dunleavy, P.C.; Yuri Gruzdkov

(57) ABSTRACT

An optical WDM system configured to use direct detection of communication signals that is compatible with electronic CD compensation on a per-channel basis. In an example embodiment, to enable full (e.g., amplitude and phase) electric-field reconstruction at the receiver, the optical WDM system uses a carrier-frequency plan according to which the carrier-frequency comb used at one end of the WDM link and the carrier-frequency comb used at the other end of the WDM link are offset with respect to one another by one half of the bandwidth of an individual WDM component transmitted therethrough. This frequency offset places each local carrier frequency at a roll-off edge of the corresponding incoming data-modulated signal. As a result, the corresponding combined optical signal beneficially lends itself to direct detection that can be followed by full electric-field reconstruction using a known self-coherent Kramers-Kronig method and then by conventional electronic CD compensation.

17 Claims, 8 Drawing Sheets

(51) Int. Cl.
    *H04B 10/61* (2013.01)
    *H04J 14/00* (2006.01)
    *H04J 14/06* (2006.01)
(58) Field of Classification Search
    CPC .... G02B 6/4292; H04J 14/0227; H04J 14/06; H04J 14/002
    See application file for complete search history.

(56) References Cited

U.S. PATENT DOCUMENTS

| | | | |
|---|---|---|---|
| 8,842,997 B2 | 9/2014 | Liu et al. | |
| 9,209,908 B2 | 12/2015 | Yu et al. | |
| 2003/0058499 A1* | 3/2003 | Reingand | H04B 10/2543 398/98 |
| 2003/0072060 A1 | 4/2003 | Sourani | |
| 2003/0189745 A1 | 10/2003 | Kikuchi et al. | |
| 2004/0223759 A1* | 11/2004 | Fee | H04B 10/079 398/33 |
| 2015/0071656 A1 | 3/2015 | Oyama et al. | |
| 2016/0284874 A1 | 9/2016 | Ho et al. | |

OTHER PUBLICATIONS

Che, X., et al., "Stokes Vector Direct Detection for Linear Complex Optical Channels," 2015, Journal of Lightwave Technology, vol. 33, No. 3, pp. 678-684.

Chen, X., et al., "High-speed Fading-free Direct Detection for Double-Sideband OFDM Signal via Block-wise Phase Switching" Optical Fiber Communication Conference and Exposition and the National Fiber Optic Engineers Conference (OFC/NFOEC), 2013 (3 pages).

Matsui, Yasuhiro, et al., "55-GHz Bandwidth Short-Cavity Distributed Reflector Laser and its Application to 112-Gb/s PAM-4," OFC Postdeadline Papers OSA, 2016 (3 pages).

Morsy-Osman, Mohamed, et al., "Four-Dimensional Modulation and Stokes Direct Detection of Polarization Division Multiplexed Intensities, Inter Polarization Phase and Inter Polarization Differential Phase," Journal of Lightwave Technology, vol. 34, No. 7, 2016, pp. 1585-1592.

Mecozzi, Antonio, et al., "Kramers—Kronig Coherent Receiver," Optica, vol. 3, No. 11, 2016, pp. 1220-1227.

Yamazaki, Hiroshi, et al., "300-Gbps Discrete Multi-tone Transmission Using Digital-Preprocessed Analog-Multiplexed DAC with Halved Clock Frequency and Suppressed Image," ECOC—Post Deadline 42nd European Conference and Exhibition on Optical Communications, 2016, pp. 25-27.

Taylor, Leonard S., "The Phase Retrieval Problem," IEEE Transactions on Antennas and Propagation, vol. AP-29, No. 2, 1981, pp. 386-391.

Mecozzi, Antonio, "A necessary and sufficient condition for minimum phase and implications for phase retrieval," IEEE Transactions on Information Theory, vol. 13, No. 9, 2014, pp. 1-9.

Savory, Seb J., "Digital filters for coherent optical receivers," Optics Express, vol. 16, Issue 2, 2008, pp. 804-817.

Extended European Search Report; dated Jan. 19, 2019 for EP Application No. 18165607.5.

Mecozzi, Antonio, Cristian Antonelli, and Mark Shtaif. "Kramers—Kronig coherent receiver." Optica 3.11 (2016): 1220-1227.

* cited by examiner

600

700

OPTICAL TRANSPORT SYSTEM EMPLOYING DIRECT-DETECTION SELF-COHERENT RECEIVERS AND COMPATIBLE TRANSMITTERS

CROSS-REFERENCE TO RELATED APPLICATIONS

This application claims the benefit of U.S. Provisional Patent Application No. 62/483,134 filed on 7 Apr. 2017, and entitled "OPTICAL TRANSPORT SYSTEM EMPLOYING DIRECT-DETECTION COHERENT RECEIVERS AND COMPATIBLE TRANSMITTERS," which is incorporated herein by reference in its entirety.

BACKGROUND

Field

The present disclosure relates to optical communication equipment and, more specifically but not exclusively, to an optical transport system employing direct-detection self-coherent receivers and compatible transmitters.

Description of the Related Art

This section introduces aspects that may help facilitate a better understanding of the disclosure. Accordingly, the statements of this section are to be read in this light and are not to be understood as admissions about what is in the prior art or what is not in the prior art.

For relatively short (e.g., ~100 km) optical links encountered in metro-area networks, direct (e.g., square-law) detection of optical signals may offer an attractive alternative to conventional coherent detection schemes because the corresponding equipment is typically less complex and, as such, may offer concomitant cost savings. However, adverse effects of chromatic dispersion (CD) may severely limit the maximum transmission distance achievable in some direct-detection systems. It is therefore desirable to have an optical transport scheme that supports both direct detection and CD compensation. It is also desirable for this optical transport scheme to be compatible with advanced modulation formats and/or wavelength division multiplexing (WDM).

SUMMARY OF SOME SPECIFIC EMBODIMENTS

Disclosed herein are various embodiments of an optical WDM system configured to use direct (square-law) detection of communication signals that is compatible with electronic CD compensation on a per-channel basis. In an example embodiment, to enable full (e.g., amplitude and phase) electric-field reconstruction at the receiver, the optical WDM system uses a carrier-frequency plan according to which the carrier-frequency comb used at one end of the WDM link and the carrier-frequency comb used at the other end of the WDM link are offset with respect to one another by one half of the bandwidth of an individual WDM component transmitted therethrough. This frequency offset places each local carrier frequency at a roll-off edge of the corresponding incoming data-modulated signal. As a result, the corresponding combined optical signal beneficially lends itself to direct detection that can be followed by full electric-field reconstruction using a known self-coherent Kramers-Kronig method and then by conventional electronic CD compensation. Various disclosed embodiments can advantageously be used, e.g., to implement a large number of WDM channels for a metro-area network in a cost-effective manner.

According to an example embodiment, provided is an apparatus, comprising: an optical port connectable to receive a first carrier frequency; an optical modulator connected to the optical port and configured to modulate the first carrier frequency with first data to generate a modulated output signal; an optical coupler connected to the optical port and configured to combine the first carrier frequency with a modulated input signal to generate a combined optical signal, the modulated input signal having a second carrier frequency modulated with second data; a photodetector configured to convert the combined optical signal into a corresponding electrical signal proportional to an optical power of the combined optical signal; and a signal processor configured to process the corresponding electrical signal to recover the second data; and wherein the second carrier frequency is offset with respect to the first carrier frequency by a fixed nonzero frequency offset.

According to another example embodiment, provided is an apparatus comprising a first WDM transceiver and a second WDM transceiver optically coupled to one another; wherein the first WDM transceiver has a first plurality of individual-channel transceivers, each of the individual-channel transceivers of the first plurality having allocated thereto a respective frequency slot on a frequency grid and configured to transmit data using a respective first carrier frequency, the respective first carrier frequencies being arranged to form a first frequency comb; wherein the second WDM transceiver has a second plurality of individual-channel transceivers, each of the individual-channel transceivers of the second plurality having allocated thereto a respective frequency slot on the frequency grid and configured to transmit data using a respective second carrier frequency, the respective second carrier frequencies being arranged to form a second frequency comb; and wherein the first frequency comb and the second frequency comb are offset with respect to one another by a fixed nonzero frequency offset.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Some embodiments can be used in an optical transport system, e.g., having a relatively large (e.g., "massive" or >100) number of WDM channels and/or hardware that enables the system to be implemented in a relatively cost-effective manner.

Some embodiments may benefit from the use of certain features of a direct-detection scheme disclosed in A. Mecozzi, et al., "Kramers-Kronig Coherent Receiver," Optica 3, pp. 1218-1227 (2016), which is incorporated herein by reference in its entirety.

Figure 1:
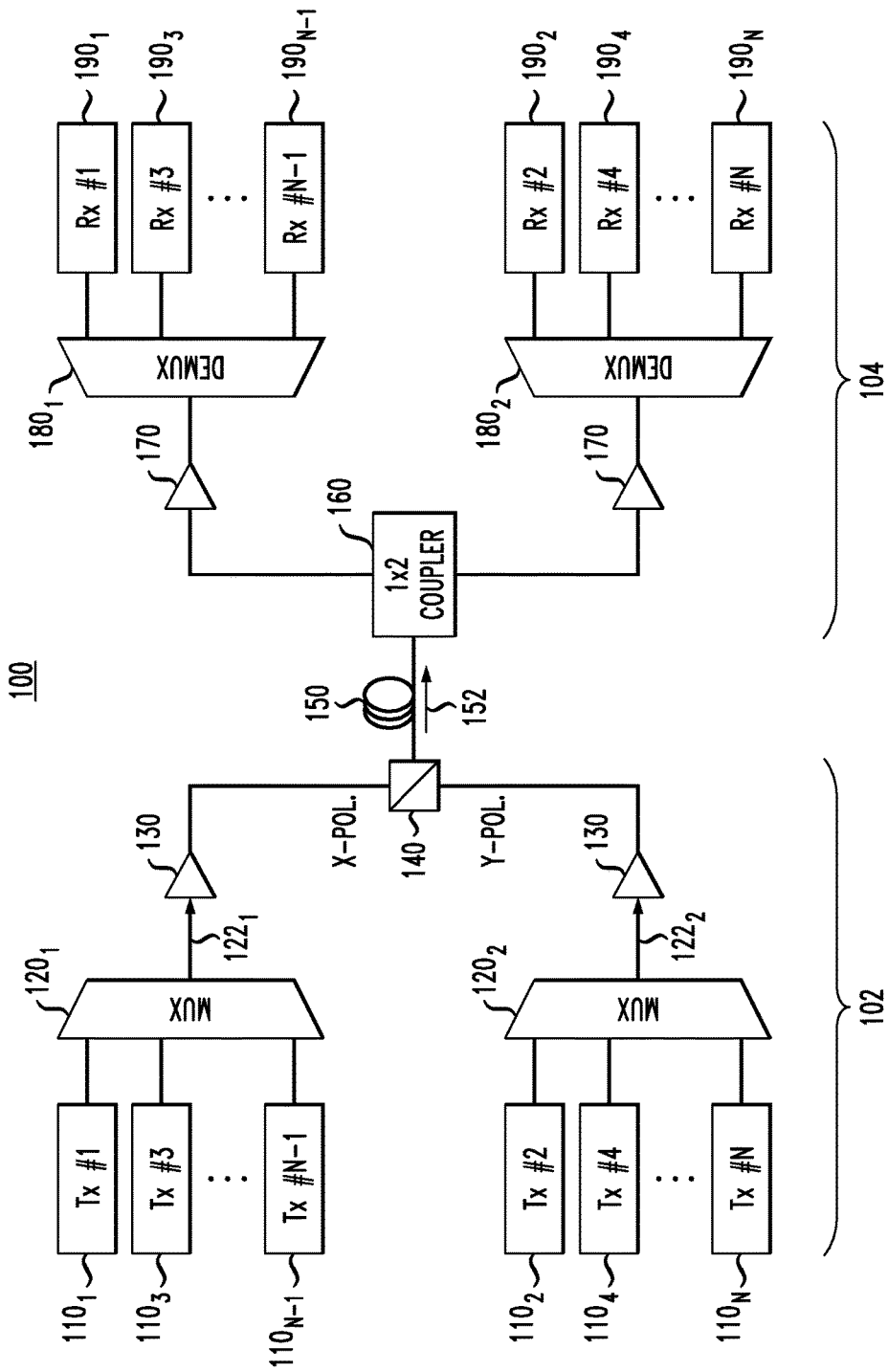
FIG. 1 shows a block diagram of an optical transport system according to an embodiment.

FIG. 1 shows a block diagram of an optical transport system 100 according to an embodiment. System 100 comprises a WDM transmitter 102 and a WDM receiver 104 connected to receive a WDM signal 152 from the transmitter, by way of a fiber-optic link 150. In an example embodiment, WDM signal 152 can be generated using a frequency (wavelength) grid, such as a frequency grid that complies with the ITU-T G.694.1 Recommendation, which is incorporated herein by reference in its entirety. Example spectral and polarization characteristics of WDM signal 152 are described in more detail below in reference to FIG. 2.

The frequency grid used in system 100 can be defined, e.g., in the frequency range from about 186 THz to about 201 THz, with a 100, 50, 25, or 12.5-GHz spacing of the channels therein. While typically defined in frequency units, the parameters of the grid can equivalently be expressed in wavelength units. For example, in the wavelength range from about 1528.8 nm to about 1563.9 nm, the 100-GHz spacing between the centers of neighboring WDM channels is equivalent to approximately 0.8 nm spacing. In alternative embodiments, other frequency grids can be used as well.

The following terms are used herein to refer to certain characteristics of a frequency grid.

Frequency grid: A reference set of frequencies used to denote nominal central frequencies that may be used for defining specifications and applications.

Frequency slot: The frequency range allocated to a slot and unavailable to other slots within a frequency grid. A frequency slot is defined by its nominal central frequency and its slot width. A frequency slot may also be referred to as a WDM channel.

Slot width: The full width of a frequency slot in a frequency grid.

Channel spacing: The frequency difference between the nominal central frequencies of the pertinent frequency slots (WDM channels).

WDM transmitter 102 comprises individual-channel transmitters $110_1$-$110_N$, each configured to generate a corresponding WDM component of WDM signal 152 using a different respective carrier frequency (wavelength) spectrally arranged in accordance with the operative frequency grid. Transmitters $110_n$ corresponding to odd WDM channels (e.g., n=1, 3, 5, . . . ) operate to generate the corresponding WDM components of WDM signal 152 such that each of those WDM components has a first (e.g., X) polarization. Transmitters $110_n$ corresponding to even WDM channels (e.g., n=2, 4, 6, . . . ) similarly operate to generate the corresponding WDM components of WDM signal 152 such that each of those WDM components has a second (e.g., Y) polarization orthogonal to the first polarization. Herein, the index n is an integer from the interval [1, N]. Several example embodiments of transmitter $110_n$ are described in more detail below in reference to FIGS. 3A-3C.

WDM transmitter 102 further comprises multiplexers $120_1$ and $120_2$, two optional optical amplifiers 130, and a polarization beam combiner 140. Multiplexer (MUX) $120_1$ operates to combine the odd WDM components in a polarization-maintaining manner. A resulting multiplexed signal $122_1$ can optionally be amplified in the corresponding one of optical amplifiers 130. MUX $120_2$ similarly operates to combine the even WDM components in a polarization-maintaining manner. A resulting multiplexed signal $122_2$ can be optionally amplified in the other one of optical amplifiers 130. Polarization beam combiner 140 operates to polarization-interleave (the optionally amplified) multiplexed signals $122_1$ and $122_2$, thereby generating WDM signal 152.

In an example embodiment, an optical amplifier 130 can be implemented using a polarization-maintaining (PM) erbium-doped fiber amplifier (EDFA).

WDM receiver 104 comprises a 1×2 coupler 160 that can be implemented, e.g., using a regular polarization-insensitive 3-dB power splitter. The two attenuated copies of the received WDM signal 152 generated by 1×2 coupler 160 can be optionally amplified by EDFAs 170. In an alternative embodiment, the two EDFAs 170 may be replaced by a single EDFA located upstream from coupler 160.

Figure 2:
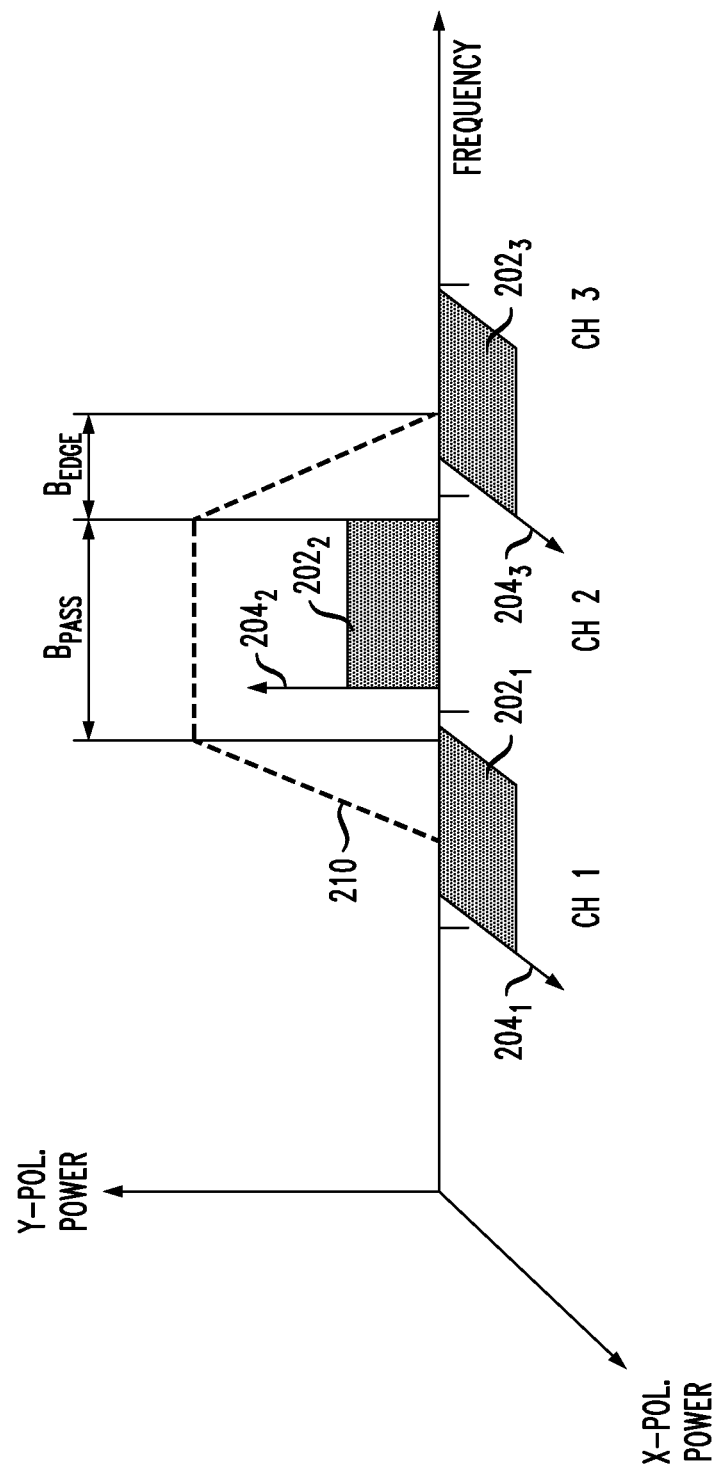
FIG. 2 graphically illustrates example spectral and polarization characteristics of a WDM signal used in the optical transport system of FIG. 1 according to an embodiment.

One copy of the (optionally amplified) received WDM signal 152 produced by coupler 160 is de-multiplexed by a demultiplexer (DEMUX) $180_1$ whose pass-bands are configured to allow the odd WDM components of WDM signal 152 to pass through, while significantly attenuating the even WDM components thereof (also see FIG. 2). The other copy of the (optionally amplified) received WDM signal 152 produced by coupler 160 is de-multiplexed by DEMUX $180_2$ whose pass-bands are configured to allow the even WDM components of WDM signal 152 to pass through, while significantly attenuating the odd WDM components thereof. Each of the resulting optical signals generated by DEMUXes $180_1$ and $180_2$ is then applied to and detected using a respective one of individual-channel receivers $190_1$-$190_N$. An example embodiment of receiver $190_n$ is described in more detail below in reference to FIG. 4.

Polarization interleaving is used in system 100 to reduce (e.g., minimize) inter-channel interference between neighboring channels at the point of detection, thereby allowing for MUXes 120 and DEMUXes 180 to be implemented using optical filters with relaxed frequency tolerances. Besides polarization interleaving, the pass-bands of MUXes 120 and DEMUXes 180 may be configured such that the center frequency of a pass-band has an offset relative to the center frequency of the signal spectrum. The latter feature can be used to reduce (e.g., minimize) the linear beat product(s) from the neighboring channel that has its CW (continuous-wave) component closer to the edge of the channel of interest (also see FIG. 2).

FIG. 2 graphically illustrates example spectral and polarization characteristics of WDM signal 152 according to an embodiment. For illustration purposes and without any implied limitation, FIG. 2 shows only three WDM channels, which are labeled CH1, CH2, and CH3, respectively. A person of ordinary skill in the art will understand that WDM signal 152 can have a different number of WDM channels arranged in a similar manner.

Also schematically shown in FIG. 2 is an example spectral shape of a pass band of DEMUX $180_2$ corresponding to channel CH2. A person of ordinary skill in the art will understand that the pass bands of DEMUX $180_1$ corresponding to channels CH1 and CH3 may have similar spectral shapes, appropriately shifted in frequency.

As indicated in FIG. 2, each of WDM channels CH1, CH2, and CH3 carries (i) a respective data-modulated signal represented by a rectangle $202_n$ and (ii) a respective CW component represented by an arrow $204_n$. CW component $204_n$ is approximately spectrally aligned with a roll-off edge of the data-modulated signal $202_n$ and can be used as a local-oscillator signal at the corresponding individual-channel receiver $190_n$ to recover the data encoded in the data-modulated signal $202_n$, e.g., as explained in the above-cited paper by A. Mecozzi, et al. In the shown embodiment, CW component $204_n$ is imprinted onto data-modulated signal $202_n$ at transmitter $110_n$. However, in some alternative embodiments, CW component $204_n$ can be added to the data-modulated signal $202_n$ at receiver $190_n$, e.g., as described in reference to FIGS. 6-7.

The substantially flat portion $B_{pass}$ of pass band 210 is approximately aligned with the frequency slot allocated to channel CH2 on the frequency grid. $B_{edge}$ denotes the width of the roll-off edge of pass band 210, e.g., down to ~20-dB rejection level from the level of $B_{pass}$. The above-mentioned relaxed frequency tolerances of DEMUXes 180 are evident in FIG. 2 from the position of pass band 210 with respect to the frequency slots allocated to channels CH1 and CH3.

Figure 3C:
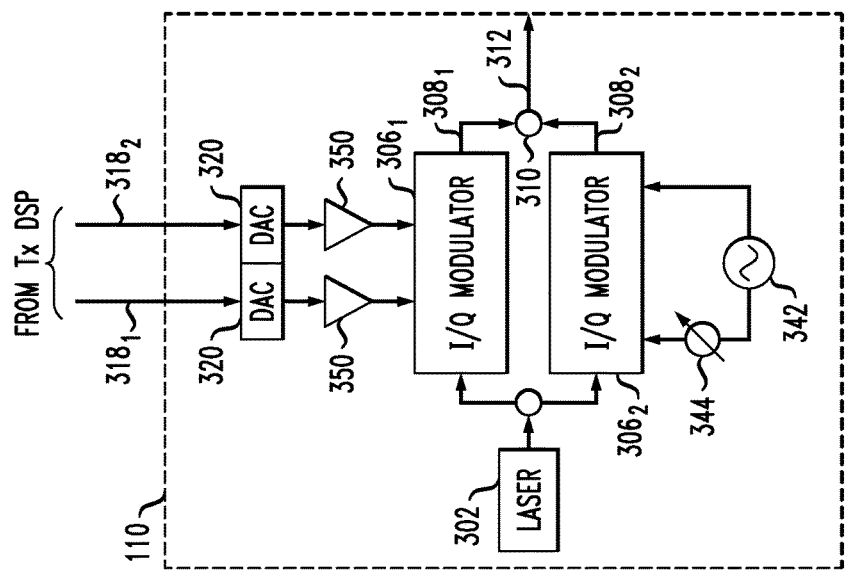
FIGS. 3A-3C show block diagrams of an individual channel transmitter that can be used in the optical transport system of FIG. 1 according to some embodiments.
Figure 3B:
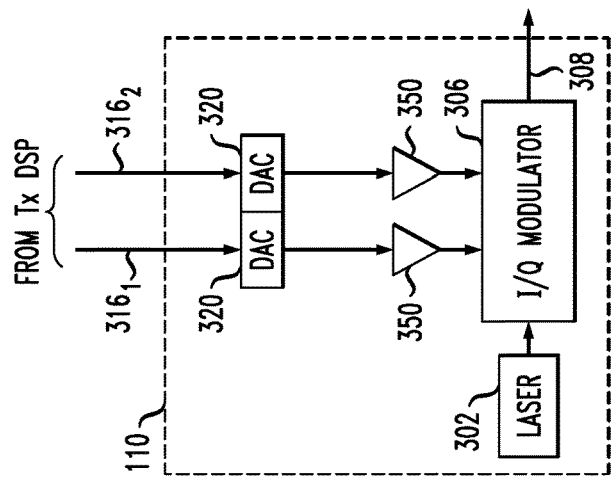
Figure 3A:
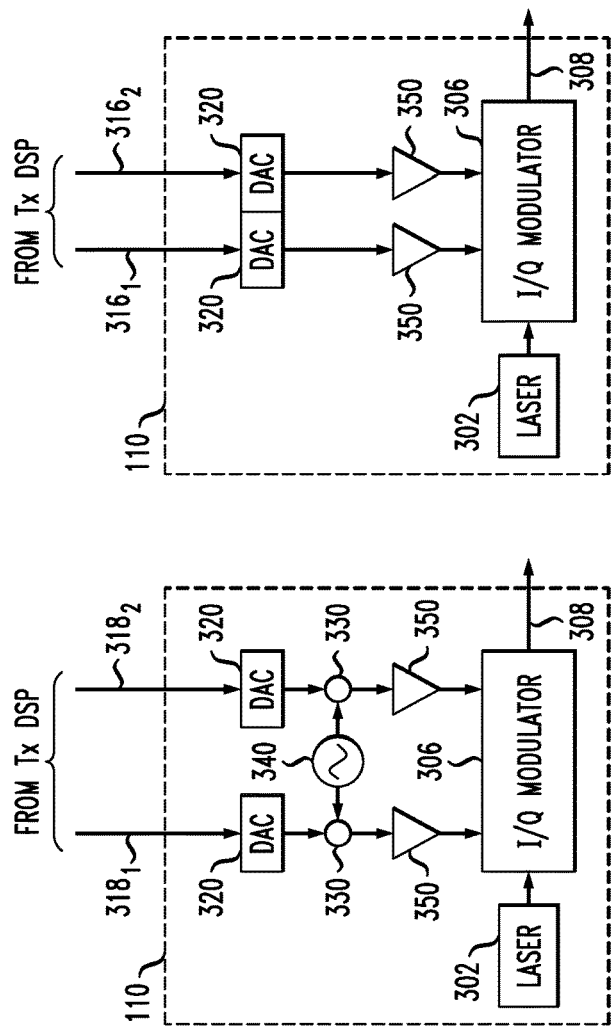

FIGS. 3A-3C show block diagrams of an individual channel transmitter 110 (FIG. 1) according to some example embodiments. Each of the shown transmitters 110 is capable of generating a signal for populating a corresponding WDM channel and having the characteristics described above in reference to FIG. 2.

Referring to FIG. 3A, in this particular embodiment, transmitter 110 comprises a laser 302, an I/Q modulator 306, two digital-to-analog converters (DACs) 320, two RF drivers 350, two RF power combiners 330, and an RF synthesizer 340. DACs 320 receive digital signals $318_1$ and $318_2$ that can be generated by the transmitter's digital signal processor (DSP, not explicitly shown in FIG. 3A) in a conventional manner to cause I/Q modulator 306 to generate the corresponding data-modulated signal $202_n$ (see FIG. 2) at its optical output 308. RF synthesizer 340 and power combiners 330 operate to insert into optical output 308 a corresponding CW component $204_n$ at the desired roll-off edge of the data-modulated signal $202_n$ (also see FIG. 2). For example, the relative phase of the two RF-signal paths corresponding to the two power combiners 330 can be engineered such that the RF-signal components added by RF synthesizer 340 to the data-encoded portion of the RF drive signals applied to I/Q modulator 306 by RF drivers 350 cause the I/Q modulator to generate a corresponding single sideband in the optical spectrum, thereby inserting only a single CW component $204_n$ at the desired side of the optical spectrum of data-modulated signal $202_n$.

In the embodiment shown in FIG. 3B, DACs 320 receive digital signals $316_1$ and $316_2$ that can be generated by the transmitter's DSP (not explicitly shown in FIG. 3B) in a conventional manner to cause I/Q modulator 306 to generate, at optical output 308, both the corresponding data-modulated signal $202_n$ and CW component $204_n$. For example, conventional digital single-sideband modulation techniques can be used, as known in the pertinent art, to cause RF drivers 350 to apply to I/Q modulator 306 appropriate drive-signal components suitable for this purpose.

In the embodiment of FIG. 3C, transmitter 110 has two I/Q modulators 306 (labeled $306_1$ and $306_2$, respectively), which are connected in parallel as indicated in FIG. 3C. I/Q modulator $306_1$ is driven using digital signals $318_1$ and $318_2$, DACs 320, and RF drivers 350 (also see FIG. 3A) to generate, at its optical output $308_1$, the corresponding data-modulated signal $202_n$. I/Q modulator $306_2$ is configured to operate as a frequency-shifting modulator to shift a tapped-off portion of the carrier wave generated by laser 302 by an appropriate frequency amount to generate, at its optical output $308_2$, the corresponding CW component $204_n$. An optical coupler 310 is then used to optically combine the data-modulated signal $202_n$ and the CW component $204_n$ received by way of optical outputs $308_1$ and $308_2$, respectively, to generate a combined optical signal 312 for the corresponding channel, the combined optical signal 312 having the characteristics indicated in FIG. 2.

In the embodiment shown in FIG. 3C, I/Q modulator $306_2$ is configured to operate as a frequency-shifting modulator using a drive circuit comprising an RF synthesizer 342 and a phase shifter 344, connected as known in the pertinent art to drive different arms of that I/Q modulator. A person of ordinary skill in the art will understand that alternative drive circuits for causing I/Q modulator $306_2$ to operate as a frequency-shifting modulator can similarly be used.

Figure 4:
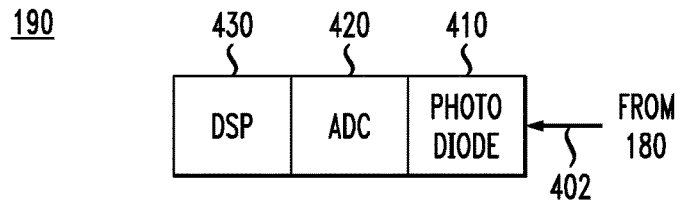
FIG. 4 shows a block diagram of an individual channel receiver that can be used in the optical transport system of FIG. 1 according to an embodiment.

FIG. 4 shows a block diagram of an individual channel receiver 190 (FIG. 1) according to an embodiment. Receiver 190 comprises a photodiode 410, an analog-to-digital converter (ADC) 420, and a DSP 430. Receiver 190 is a direct-detection receiver because photodiode 410 is configured to convert a received optical signal 402 into a corresponding electrical signal that is proportional to the optical power (electric field squared) thereof, and apply that electrical signal to ADC 420. In a typical embodiment, optical signal 402 represents a corresponding WDM component of WDM signal 152 and is generated by passing the latter through a respective pass band 210 (see FIG. 2) of the corresponding DEMUX 180 (FIG. 1). Photodiode 410 can be the only photodiode used in receiver 190.

Due to the presence of both data-modulated signal $202_n$ and CW component $204_n$ (see FIG. 2), the digital electrical signal generated by ADC 420 in response to the electrical signal applied thereto by photodiode 410 enables DSP 430 to fully reconstruct the electric field (e.g., both amplitude and phase) of the corresponding WDM component of WDM signal 152. Example signal processing algorithms that can be used by DSP 430 for this purpose are disclosed, e.g., in the above-cited paper by A. Mecozzi, et al.

Using the digital signals that represent the reconstructed electric field of the corresponding WDM component of WDM signal 152, DSP 430 can be configured to perform dispersion compensation and other signal-equalization processing, in a conventional manner. As already indicated above, the latter feature can advantageously be used, e.g., to extend the maximum transmission distance over which WDM signal 152 can be transmitted in system 100 with an acceptable bit-error rate (BER).

Figure 5:
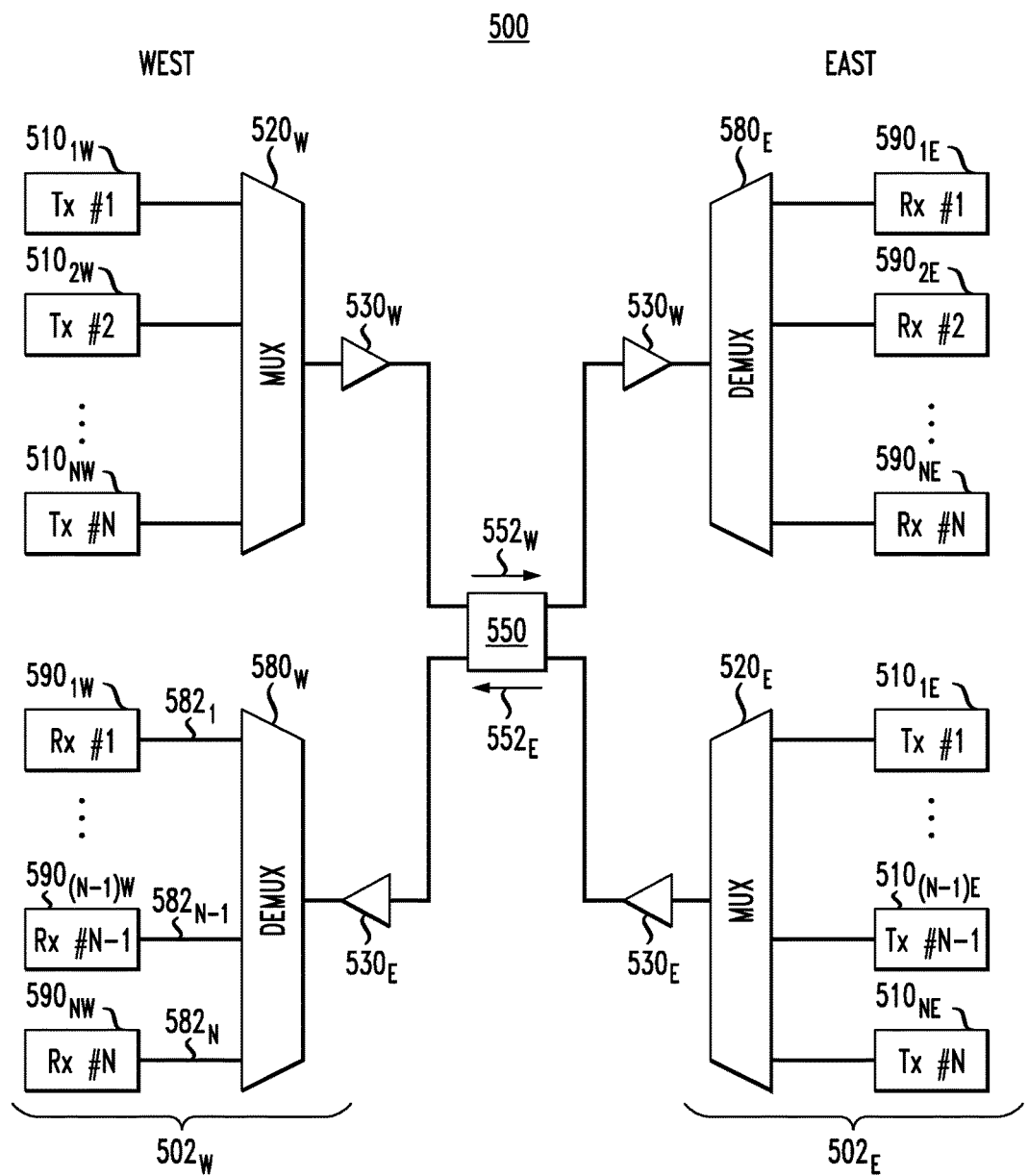
FIG. 5 shows a block diagram of an optical transport system according to an alternative embodiment.

FIG. 5 shows a block diagram of an optical transport system 500 according to an alternative embodiment. System 500 is designed and configured for bidirectional data transport between WDM transceivers $502_W$ and $502_E$. For illustration purposes and to simplify the description, WDM transceivers $502_W$ and $502_E$ are referred-to herein as being located at the West and East ends, respectively, of an optical link 550. In an example embodiment, optical link 550 can be implemented using one or more optical fibers (e.g., one per propagation direction) or a fiber-optic cable. Optical link 550 may include other optical elements, such as splitters, combiners, couplers, amplifiers, switches, etc., as known in the pertinent art.

System 500 can be used to transport polarization-division-multiplexed (PDM) signals, wherein each of the two orthogonal polarizations of each WDM channel can be used to carry a different respective data stream. In an example embodiment, system 500 can be designed to operate using direct-detection and electric-field-reconstruction principles that are similar to those of system 100 (FIG. 1). An added capability in system 500 is the electronic polarization demultiplexing that can be applied on a per-channel basis in a conventional manner.

System 500 differs from system 100 (FIG. 1) in that, instead of receiving a corresponding CW component $204_n$ from the remote transmitter (as in system 100), each individual channel receiver $590_n$ in system 500 is configured to use the carrier wave generated in the corresponding co-located individual channel transmitter $510_n$ as the aforementioned CW component to enable direct-detection-based electric-field reconstruction by the receiver's DSP. In other words, a single respective laser can be shared by each individual channel transmitter/receiver pair at each of WDM transceivers $502_W$ and $502_E$.

WDM transceiver $502_W$ comprises individual-channel transmitters $510_{1W}$-$510_{NW}$, each configured to generate a corresponding WDM component of a WDM signal $552_W$ using a different respective carrier frequency spectrally arranged in accordance with an operative frequency grid. A multiplexer (MUX) $520_W$ operates to combine the WDM components, thereby generating WDM signal $552_W$ that is applied to link 550 for transmission to WDM transceiver $502_E$. Along the propagation path, WDM signal $552_W$ can be optionally amplified in one or more optical amplifiers $530_W$.

WDM transceiver $502_W$ further comprises individual-channel receivers $590_{1W}$-$590_{NW}$, each configured to detect and decode a corresponding WDM component $582_n$ of a WDM signal $552_E$ received by way of link 550 from WDM transceiver $502_E$. Along the propagation path, WDM signal $552_E$ can be optionally amplified in one or more optical amplifiers $530_E$. A demultiplexer (DEMUX) $580_W$ separates the WDM components of WDM signal $552_E$ using a plurality of pass bands, each configured to pass only one corresponding WDM component $582_n$ and significantly attenuate or reject the others.

In an example embodiment, each WDM component $582_n$ may have spectral characteristics that are similar to those of data-modulated signal $202_n$ (see FIG. 2). Prior to detection in the corresponding individual-channel receiver $590_{nW}$, WDM component $582_n$ is combined (mixed) with the carrier frequency generated by the laser used in individual-channel transmitter $510_{nW}$. This mixing serves to provide a CW component that acts as CW component $204_n$ (also see FIG. 2). The resulting combined optical signal has both the respective data-modulated signal and the respective CW component, which enables receiver $590_{nW}$ to (i) convert the combined optical signal into a corresponding electrical signal using direct detection and (ii) reconstruct the amplitude and phase of the electric field of the corresponding WDM component $582_n$ using the signal processing algorithms similar to those used in receiver $190_n$ (FIG. 1).

WDM transceiver $502_E$ can be constructed using components similar to those of WDM transceiver $502_W$ and configured to operate in a similar manner. A description of WDM transceiver $502_E$ can therefore be obtained from the above description of WDM transceiver $502_W$, e.g., by interchanging the subscripts E and W. It should be noted however that the set of carrier frequencies generated in individual-channel transmitters $510_{1W}$-$510_{NW}$ differs from the set of carrier frequencies generated in individual-channel transmitters $510_{1E}$-$510_{NE}$, e.g., as further explained below in reference to FIGS. 6-8. Accordingly, MUX $520_W$ and MUX $520_E$ may have different pass-band configurations, and DEMUX $580_W$ and DEMUX $580_E$ may similarly have different pass-band configurations.

Figure 6:
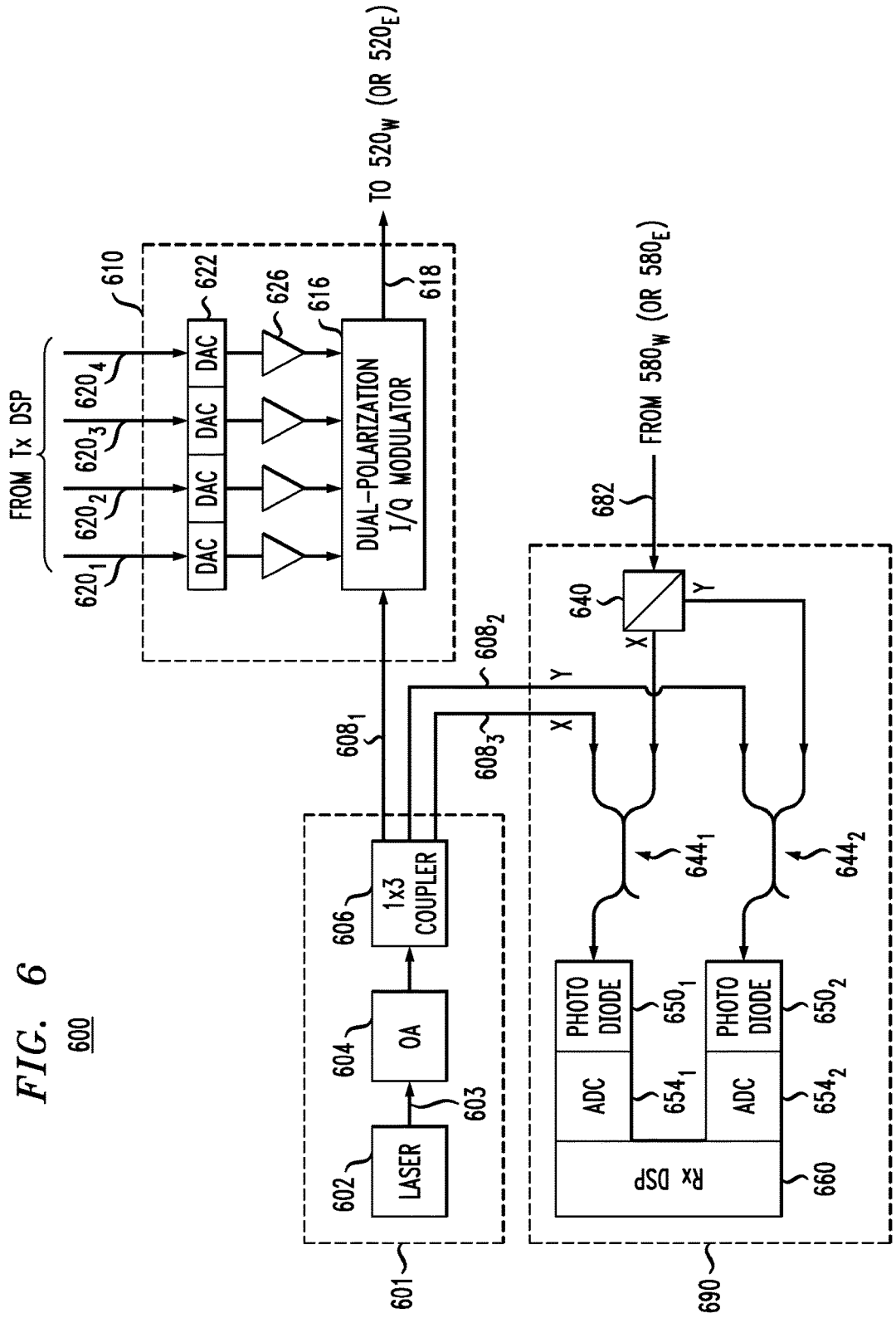
FIG. 6 shows a block diagram of an optical transceiver that can be used in the optical transport system of FIG. 5 according to an embodiment.

FIG. 6 shows a block diagram of an optical transceiver 600 that can be used in system 500 (FIG. 5) according to an embodiment. More specifically, optical transceiver 600 can be used to implement any transmitter/receiver pair comprising (i) an individual-channel transmitter $510_n$ and (ii) an individual-channel receiver $590_n$ at either of WDM transceivers $502_W$ and $502_E$.

In an example embodiment, optical transceiver 600 comprises a light source 601, a transmitter portion 610, and a receiver portion 690. An optical output 618 of transmitter portion 610 is connected to a corresponding optical input of MUX $520_E$ or $520_W$ (FIG. 5). An optical input 682 of receiver portion 690 is connected to a corresponding optical output of DEMUX $580_E$ or $580_W$ (FIG. 5).

Light source 601 has three optical outputs, which are labeled $608_1$, $608_2$, and $608_3$, respectively. Optical output $608_1$ is connected to transmitter portion 610 to provide light of the corresponding carrier frequency to be modulated therein. Optical outputs $608_2$ and $608_3$ are connected to receiver portion 690 to provide thereto the corresponding CW component $204_n$ (also see FIG. 2). The optical connections running from optical outputs $608_1$, $608_2$, and $608_3$ to the downstream circuits can be implemented using polarization-maintaining fibers and/or waveguides, as known in the pertinent art.

In an example embodiment, light source 601 comprises a laser 602, an (optional) optical amplifier 604, and a 1×3 optical coupler 606. Light source 601 operates to generate a light beam 603 having the carrier frequency. Optical amplifier 604 is configured to boost the optical power of light beam 603 such that coupler 606 can transfer sufficient carrier-frequency power to each of optical outputs $608_1$, $608_2$, and $608_3$. The light beam applied to optical output $608_1$ typically has both X- and Y-polarization components to enable transmitter portion 610 to generate a PDM signal at optical output 618. The light beams applied to optical outputs $608_2$ and $608_3$ can be Y- and X-polarized, respectively, to appropriately support the dual-polarization functionality of receiver portion 690.

Transmitter portion 610 comprises a dual-polarization I/Q modulator 616, four DACs 622, and four RF drivers 626. DACs 622 are configured to receive digital signals $620_1$-$620_4$ that can be generated by the transmitter's DSP (not explicitly shown in FIG. 6) in a conventional manner to cause I/Q modulator 616 to generate the corresponding data-modulated signals $202_n$ (see FIG. 2) for each of the X- and Y-polarizations of the optical output beam generated at optical output 618.

Receiver portion 690 comprises a polarization beam splitter (PBS) 640, optical couplers $644_1$ and $644_2$, photodiodes $650_1$ and $650_2$, ADCs $654_1$ and $652_2$, and a DSP 660. PBS 640 operates to split an optical input signal received at optical input 682 into X- and Y-polarization components thereof, with the X-polarization component being directed to optical coupler $644_1$, and the Y-polarization component being directed to optical coupler $644_2$. Optical coupler $644_1$ operates to mix the received X-polarization component of the optical input signal with the X-polarized carrier wave received from optical output $608_3$. Optical coupler $644_2$ similarly operates to mix the received Y-polarization component of the optical input signal with the Y-polarized carrier wave received from optical output $608_2$.

In an example embodiment, each of optical couplers $644_1$ and $644_2$ can have a splitting ratio that deviates from 50:50, such as a 33:67 or 10:90 ratio. The 10:90 asymmetric couplers can be specifically used in some embodiments as couplers $644_1$ and $644_2$, e.g., to reduce the attenuation of the communication signal while avoiding the complexity of a balanced heterodyne setup typically used for similar purposes in conventional receiver front ends. For example, the communication signal can be applied to the 90% coupler port, e.g., to reduce the corresponding insertion loss for that signal. On the other hand, the relatively high insertion losses corresponding to the 10% coupler port can be easily compensated, e.g., by appropriately setting the optical gain of amplifier 604.

Photodiode $650_1$ operates to detect the X-polarized mixed optical signal applied thereto by optical coupler $644_1$, and ADC $654_1$ then appropriately samples the resulting electrical signal. Photodiode $650_2$ similarly operates to detect the Y-polarized mixed optical signal applied thereto by optical coupler $644_2$, and ADC $654_2$ then appropriately samples the resulting electrical signal. DSP 660 operates to jointly process both digital signals generated in this manner by ADCs $654_1$ and $652_2$ to first reconstruct the optical field individually for each of the X and Y polarizations, and then performs 2×2 MIMO equalization to, inter alia, reconstruct the electric fields of the two original PDM signal components generated at the remote transmitter, e.g., as known in the art of digital coherent detection.

Figure 7:
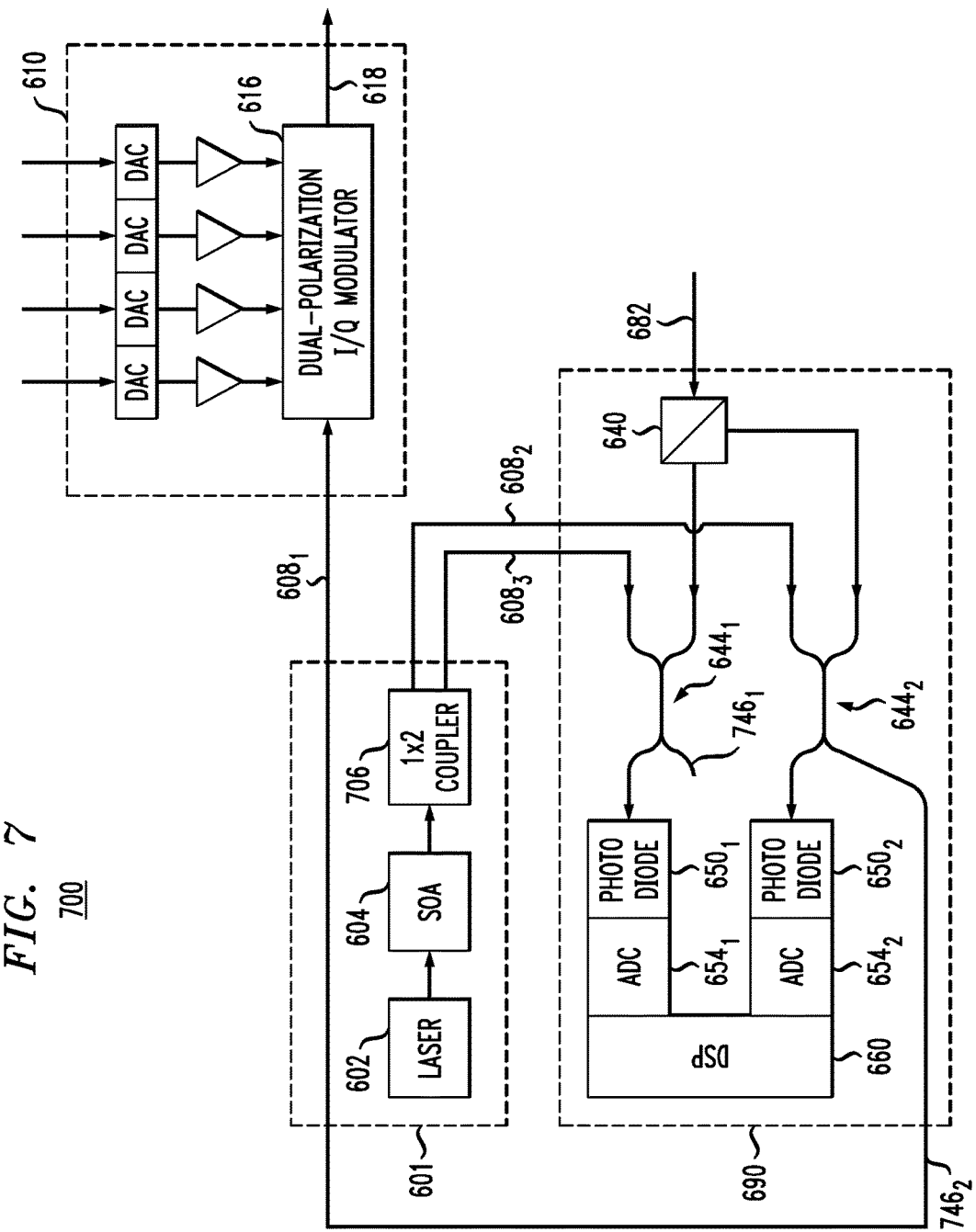
FIG. 7 shows a block diagram of an optical transceiver that can be used in the optical transport system of FIG. 5 according to an alternative embodiment.

FIG. 7 shows a block diagram of an optical transceiver 700 that can be used in system 500 according to an alternative embodiment.

Transceiver 700 differs from transceiver 600 (FIG. 6) in that I/Q modulator 616 of transmitter portion 610 is connected to receive the carrier frequency for modulation therein from the previously unused second output port (labeled $746_2$ in FIG. 7) of optical coupler $644_2$, which is connected to optical output $608_1$ of the modified light source 601. The corresponding modification of light source 601 includes replacing the previously used 1×3 optical coupler 606 by a 1×2 optical coupler 706.

When optical coupler $644_2$ is a 10:90 asymmetric coupler, output port $746_2$ outputs ~10% of modulated signal power and ~90% of unmodulated laser power. Provided that the receive/transmit inter-channel crosstalk caused by the residual (~10%) modulated signal applied to optical output $608_1$ in transceiver 700 is acceptable for the particular embodiment of optical transport system 500, the shown transceiver can improve the optical power budget by, in effect, recycling the previously lost portion of the output power of laser 602.

In some embodiments, optical output $608_1$ can be further connected, e.g., by way of a polarization beam combiner (not explicitly shown in FIG. 7), to also receive light from the second output port (labeled $746_1$ in FIG. 7) of optical coupler $644_1$. The latter feature can be used, e.g., to further improve the light-recycling efficiency in transceiver 700.

Figure 8:
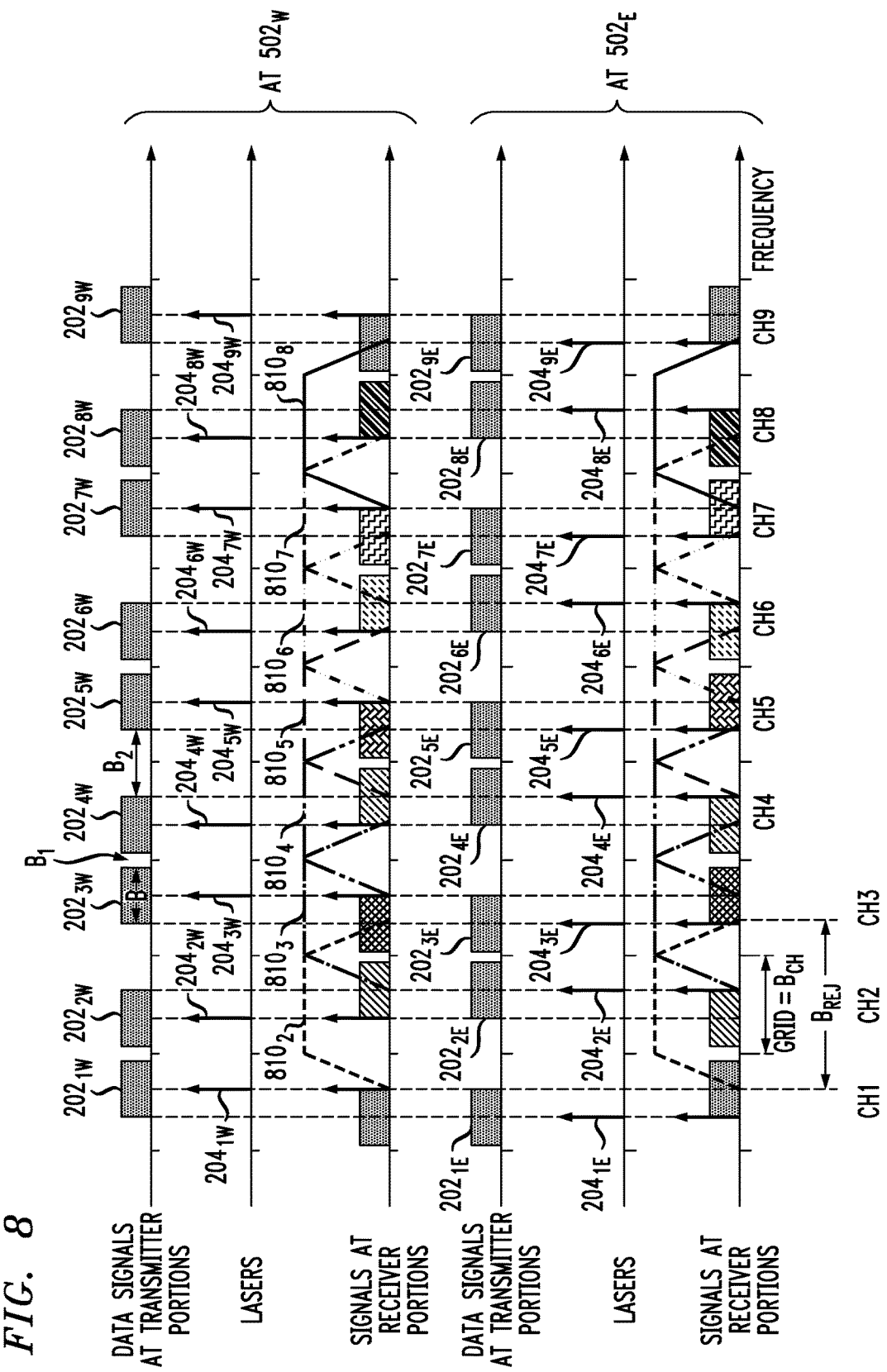
FIG. 8 graphically shows a WDM-channel configuration that can be used in the optical transport system of FIG. 5 according to an embodiment.

FIG. 8 graphically shows a WDM-channel configuration that can be used in system 500 according to an embodiment. Only one polarization is illustrated in FIG. 8 for clarity. A person of ordinary skill in the art will understand that the second polarization can be transmitted using the same set of carrier frequencies and the same WDM-channel configuration. The top three frequency strips shown in FIG. 8 illustrate the WDM configuration of transceiver $502_W$. The bottom three frequency strips shown in FIG. 8 similarly illustrate the WDM configuration of transceiver $502_E$.

WDM signal $552_W$ generated by transceiver $502_W$ carries a plurality of data-modulated signals $202_{nW}$, where n is the index that points to channel CHn. The topmost frequency strip in FIG. 8 shows an example of the plurality of data-modulated signals $202_{nW}$ corresponding to channels CH1-CH9 of WDM signal $552_W$. The laser lines generated by the corresponding plurality of lasers 602 (FIG. 6) that are used for generating the shown data-modulated signals $202_{nW}$ are shown in FIG. 8 in the second-from-the-top frequency strip. These laser lines are labeled in FIG. 8 as $204_{nW}$ because they are also used, on a per-channel basis, for direct-detecting the incoming data-modulated signals $202_{nE}$ carried by WDM signal $552_E$, which is generated at transceiver $502_E$. The spectral shape of a data-modulated signal $202_{nW}$ is typically symmetric with respect to the corresponding laser line $204_{nW}$.

The fourth-from-the-top frequency strip in FIG. 8 shows an example of the plurality of data-modulated signals $202_{nE}$ corresponding to channels CH1-CH9 of WDM signal $552_E$. The laser lines generated by the corresponding plurality of lasers 602 (FIG. 6) that are used for generating the shown data-modulated signals $202_{nE}$ are shown in FIG. 8 in the second-from-the-bottom frequency strip. These laser lines are labeled in FIG. 8 as $204_{nE}$ because they are also used, on a per-channel basis, for direct-detecting the incoming data-modulated signals $202_{nW}$ carried by WDM signal $552_W$. The spectral shape of a data-modulated signal $202_{nE}$ is typically symmetric with respect to the corresponding laser line $204_{nE}$.

Note that the plurality of laser lines (laser comb) $\{204_{nW}\}$ generated at transceiver $502_W$ do(es) not line up with the plurality of laser lines (laser comb) $\{204_{nE}\}$ generated at transceiver $502_E$. More specifically, for channel CHn, the frequency offset between laser line $204_{nW}$ and laser line $204_{nE}$ is approximately B/2, where B is the bandwidth of the corresponding data-modulated signal. For some n (e.g., n=2, 4, 6, 8 in FIG. 8), laser line $204_{nW}$ is located at a lower frequency than laser line $204_{nE}$. For some other n (e.g., n=1, 3, 5, 7, 9 in FIG. 8), laser line $204_{nW}$ is located at a higher frequency than laser line $204_{nE}$.

As already indicated above, at each of transceivers $502_W$ and $502_E$, the same laser line, $204_{nW}$ or $204_{nE}$, is simultaneously used as (i) the carrier wavelength for generating the outgoing data-modulated signal $202_n$ and (ii) the CW component $204_n$ for direct-detecting the incoming data-modulated signal $202_n$, with the use being on a per-channel basis. As a result, at the n-th receiver portion (e.g., 690, FIG. 6) of transceiver $502_W$, which is configured to direct-detect the WDM component of signal $552_E$ corresponding to CHn, the optical signal applied to the corresponding photodiode (e.g., 650, FIG. 6) includes: (i) data-modulated signal $202_{nE}$ generated by the n-th transmitter portion (e.g., 610, FIG. 6) of transceiver $502_E$, and (ii) CW component $204_{nW}$ generated by the corresponding local laser (e.g., 602, FIG. 6). The spectra of the optical signals applied to the corresponding photodiodes in the receiver portions of transceiver $502_W$ are shown in FIG. 8 in the third-from-the-top frequency strip. Similarly, at the n-th receiver portion of transceiver $502_E$, which is configured to direct-detect the WDM component of signal $552_W$ corresponding to CHn, the optical signal applied to the corresponding photodiode includes: (i) data-modulated signal $202_{nW}$ generated by the n-th transmitter portion of transceiver $502_W$, and (ii) CW component $204_{nE}$ generated by the corresponding local laser. The spectra of the optical signals applied to the corresponding photodiodes in the receiver portions of transceiver $502_E$ are shown in FIG. 8 in bottommost frequency strip.

The following nomenclature is used in FIG. 8 to indicate certain features of the shown WDM configuration(s).

As already mentioned above, B denotes the effective bandwidth of a data-modulated signal $202_n$ (also see FIG. 2). In an example embodiment, each WDM component of signals $552_E$ and $552_W$ transmitted in system 500 can have the same effective bandwidth B.

$B_{CH}$ denotes the slot width in the used frequency grid.

$B_1$ and $B_2$ denote the frequency gaps between the roll-off edges of adjacent data-modulated signals, such as between signals $202_{n-1}$ and $202_n$ and between signals $202_n$ and $202_{n+1}$, wherein $B_1 \leq B_2$. In an example embodiment, $B_1 \neq B_2$. As a result, the gap width alternates between the smaller value and the larger value, with the frequency gap being narrower at one side of data-modulated signal $202_n$ and wider at the other side thereof. For some signals $202_n$, the wider gap $B_2$ is located at the lower-frequency side of the signal. For other signals $202_n$, the wider gap $B_2$ is located at the higher-frequency side of the signal.

$B_{REJ}$ denotes a rejection bandwidth of a pass band of DEMUX 580 (FIG. 5). $B_{REJ}$ can be defined, e.g., as the spectral width between two −20 dB attenuation points, which are measured with respect to the level of the relatively flat portion of the pass band spectrally located in the middle of the spectral range thereof. In an example embodiment, each pass band of DEMUX 580 may have the same spectral shape, albeit shifted in frequency to be aligned with the corresponding WDM channel. Several examples of such spectral shapes (labeled $810_n$) are shown in FIG. 8 in the third-from-the-top frequency strip and in the bottommost frequency strip. In the shown example, the pass-band configurations of DEMUX $580_E$ and DEMUX $580_W$ are nominally identical. In an alternative embodiment, the pass-band configurations of DEMUX $580_E$ and DEMUX $580_W$ may differ from one another.

In some embodiments, one or more of the following features can be implemented:
1. Rejection bandwidth $B_{REJ}$ can be significantly larger than slot width $B_{CH}$. For example, $B_{REJ}$ can be close to or on the order of $2B_{CH}$;
2. $B_2=B+B_1$;
3. $B_1=B_{CH}-1.5$ B;
4. $B_2=B_{CH}-0.5$ B (follows from features 2 and 3);
5. Laser-line spacing is alternating between ($B_{CH}-0.5$ B) and ($B_{CH}+0.5$ B);
6. Laser combs $\{204_{nW}\}$ and $\{204_{nE}\}$ are offset relative to each other by approximately B/2 such that the narrower spacing of one laser comb falls within the wider spacing of the other laser comb; and
7. DMUX 580 is implemented using filters that have a very "loose" stability with respect to the laser combs (e.g., as graphically shown FIG. 9). An approximate drift range of the pass bands can be about $B_2/2$.

In an example embodiment, the following parameters can be used:
B=32 GHz;
$B_{CH}$=50 GHz;
$B_1$=2 GHz;
$B_2$=34 GHz; and
$B_{REJ}$=100 GHz.

Figure 9:
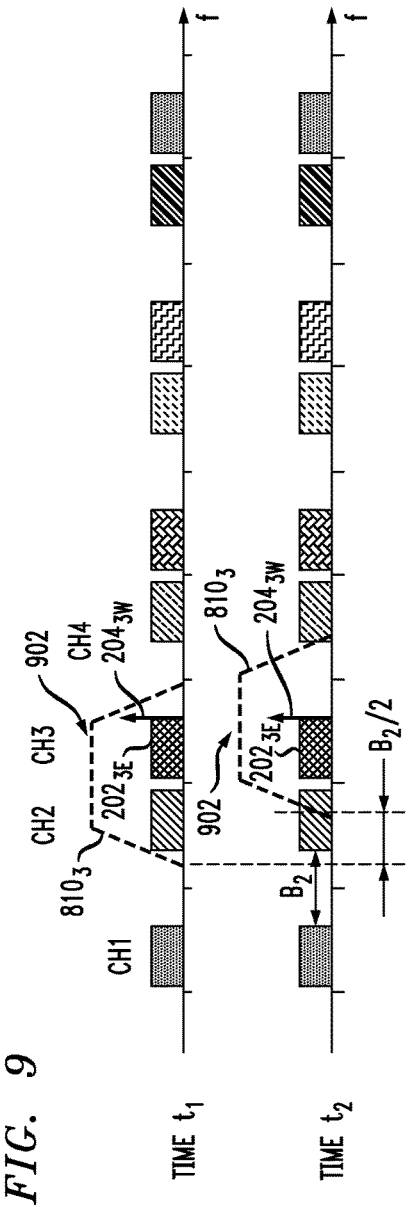
FIG. 9 graphically illustrates drift tolerances for de-multiplexers that can be used in the optical transport system of FIG. 5 according to an embodiment.

FIG. 9 graphically illustrates drift tolerances of optical filters that can be used to implement DMUXes 580 according to an embodiment. As an example, spectral positions of pass band $810_3$ of DEMUX $580_W$ at two different times, $t_1$ and $t_2$, are shown on the operative frequency grid (also see FIG. 8). As already indicated above, pass band $810_3$ corresponds to channel CH3. As explained in reference to FIG. 8, in channel CH3 of WDM transceiver $502_W$, the optical signal applied to the corresponding photodiode 650 comprises data-modulated signal $202_{3E}$ and laser line $204_{3W}$, both of which are also shown in FIG. 9.

An estimate of the drift range for pass band $810_3$, within which the performance characteristics corresponding to channel CH3 are not unacceptably affected by the drift of the pass band can be obtained, e.g., by determining the frequency range within which both data-modulated signal $202_{3E}$ and laser line $204_{3W}$ remain within a relatively flat portion 902 of the pass band. As shown in FIG. 9, at time $t_1$, the spectral position of pass band $810_3$ is such that laser line $204_{3W}$ is located at the high-frequency end of portion 902. At time $t_2$, the spectral position of pass band $810_3$ is such that the low-frequency roll-off edge of data-modulated signal $202_{3E}$ is located at the low-frequency end of portion 902. An estimated difference between these two spectral positions of pass band $810_3$ is ~$B_2/2$. The latter value provides an estimate for the filter drift tolerance.

Figure 10A:
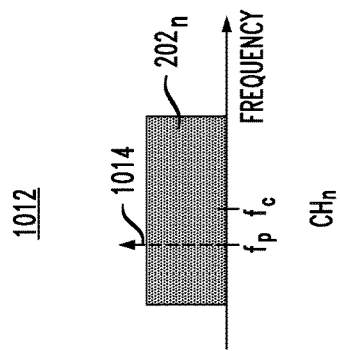
FIGS. 10A-10B graphically illustrate a laser-frequency-locking scheme that can be used in the optical transport system of FIG. 5 according to some embodiments.
Figure 10B:
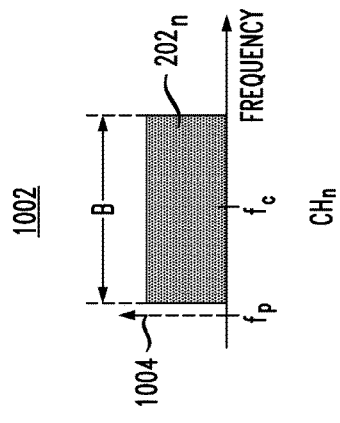

FIGS. 10A-10B graphically illustrate a laser-frequency-locking scheme that can be used in system 500 (FIG. 5) according to some embodiments. The scheme(s) illustrated by FIGS. 10A-10B can be used on a per-channel basis.

To implement some embodiments of the WDM configuration described above in reference to FIG. 8, in each channel, the local laser line $204_n$ may need to be spectrally aligned with the received data-modulated signal $202_n$ in a fairly accurate and stable manner. For example, at WDM transceiver $502_W$, each laser line $204_{nW}$ may need to be spectrally aligned with the corresponding received data-modulated signal $202_{nE}$ to appropriately place the laser line at the intended roll-off edge of the data-modulated signal. Similarly, at WDM transceiver $502_E$, each laser line $204_{nE}$ may need to be spectrally aligned with the corresponding received data-modulated signal $202_{nW}$ to appropriately place the laser line at the intended roll-off edge of the data-modulated signal.

In an example embodiment, the above-indicated spectral alignment can be achieved by frequency-locking laser combs $\{204_{nW}\}$ and $\{204_{nE}\}$ to one another, within an acceptable tolerance. In some embodiments, this frequency locking can be imposed on all lines of laser combs $\{204_{nW}\}$ and $\{204_{nW}\}$ at the same time, e.g., as described in U.S. Pat. No. 7,123,402, which is incorporated herein by reference in its entirety. In some other embodiments, this frequency locking can be implemented, e.g., on a per-channel basis. For example, one side of the channel, e.g., transceiver 600 at WDM transceiver $502_W$, can declare itself the "master" by way of a service channel. The other side, e.g., a corresponding transceiver 600 at WDM transceiver $502_E$, then responds by declaring itself a "slave" to the "master" and causes the laser line of its laser 602 to follow the laser line of the master's laser 602 at a fixed frequency offset, e.g., +B/2 or −B/2.

FIG. 10A graphically shows an example spectrum 1002 of a WDM component of WDM signal 552 that can be used to implement the above-indicated frequency locking at a slave transceiver 600 of WDM transceiver 502 according to an embodiment. Spectrum 1002 comprises data-modulated signal $202_n$ and an RF pilot tone 1004. RF pilot tone 1004 is generated at the corresponding master transceiver 600 at the remote end of link 550. In an example embodiment, RF pilot tone 1004 can be added to the transmitted signal as known in the pertinent art, e.g., using appropriately generated digital signals $620_1$-$620_4$ (see FIG. 6). The frequency $f_p$ of RF pilot tone 1004 in spectrum 1002 can be selected to be outside the bandwidth B of data-modulated signal $202_n$, which is spectrally symmetric with respect to the carrier frequency $f_c$. The frequency $f_p$ can also be selected to be different from the frequency of local laser line $204_n$ used for direct-detecting data-modulated signal $202_n$ at the slave transceiver 600. Depending on the embodiment and/or the channel number (n), the frequency $f_p$ may have a slightly higher frequency than ($f_c$+B/2) or a slightly lower frequency than ($f_c$−B/2). It may also be beneficial for RF pilot tone 1004 to have a higher spectral-power density than that of data-modulated signal $202_n$, as indicated in FIG. 10A.

Slave transceiver 600 can be configured, e.g., to appropriately filter RF pilot tone 1004 to determine its frequency $f_p$. The local laser 602 can then be configured, as known in the pertinent art, to lock the carrier frequency of its light beam 603 to the frequency $f_p$ at a proper fixed frequency offset. Since frequency $f_p$ has a fixed frequency offset with respect to the carrier frequency $f_c$ of the master laser 602, the carrier frequencies of the two lasers 602 located at the opposite ends of link 550 become locked to one another.

FIG. 10B graphically shows an example spectrum 1012 of a WDM component of WDM signal 552 that can be used to implement frequency locking at a slave transceiver 600 of WDM transceiver 502 according to an alternative embodiment. Spectrum 1012 differs from spectrum 1002 (FIG. 10A) in that it has an RF pilot tone 1014 that is located in-band with respect to data-modulated signal $202_n$. A person of ordinary skill in the art will understand how to modify the above-described frequency-locking scheme to be compatible with the in-band location of RF pilot tone 1014.

According to an example embodiment disclosed above in reference to FIGS. 1-10, provided is an apparatus (e.g., 500, FIG. 5), comprising: an optical port (e.g., 608, FIG. 6) connectable to receive a first carrier frequency (e.g., $204_{nW}$, FIG. 8); an optical modulator (e.g., 616, FIG. 6) configured to modulate the first carrier frequency with first data (e.g., $620_1$-$620_2$, FIG. 6) to generate a modulated output signal (e.g., $202_{nW}$, FIG. 8); an optical coupler (e.g., 644, FIG. 6) configured to combine the first carrier frequency with a modulated input signal (e.g., $202_{nE}$, FIG. 8) to generate a combined optical signal, the modulated input signal having a second carrier frequency (e.g., $204_{nE}$, FIG. 8) modulated with second data (e.g., $620_1$-$620_2$ of remote 600, FIG. 6); a photodetector (e.g., $650_1$, FIG. 6) configured to convert the combined optical signal into a corresponding electrical signal proportional to an optical power of the combined optical signal; and a signal processor (e.g., 654/660, FIG. 6) configured to process the corresponding electrical signal to recover the second data; and wherein the second carrier frequency is offset with respect to the first carrier frequency by a fixed nonzero frequency offset (e.g., B/2, FIG. 8).

In some embodiments of the above apparatus, the apparatus further comprises a WDM transceiver (e.g., 502, FIG. 5) having a plurality of individual-channel transceivers, wherein the optical port, the optical coupler, and the photodetector are parts of a first individual-channel transceiver (e.g., 600, FIG. 6) of the plurality.

In some embodiments of any of the above apparatus, respective optical ports (e.g., 608, FIG. 6) of the individual-channel transceivers are connectable to receive the different respective first carrier frequencies generated such that a spacing between two adjacent first carrier frequencies alternates between a first value (e.g., $B_{CH}$−0.5B, FIG. 8) and a different second value (e.g., $B_{CH}$+0.5B, FIG. 8).

In some embodiments of any of the above apparatus, the apparatus further comprises a laser (e.g., 602, FIG. 6) connected to the optical port and configured to apply thereto the first carrier frequency.

In some embodiments of any of the above apparatus, the modulated input signal is configured to carry a pilot tone (e.g., 1004, FIG. 10A; 1014, FIG. 10B).

In some embodiments of any of the above apparatus, the laser is configured to lock the first carrier frequency with respect to the pilot tone.

According to another example embodiment disclosed above in reference to FIGS. 1-10, provided is an apparatus (e.g., 500, FIG. 5), comprising: a laser (e.g., 602, FIG. 6) configured to generate a first carrier frequency (e.g., $204_{nW}$, FIG. 8); an optical modulator (e.g., 616, FIG. 6) configured to modulate the first carrier frequency with first data (e.g., $620_1$-$620_2$, FIG. 6) to generate a modulated output signal (e.g., $202_{nW}$, FIG. 8); an optical coupler (e.g., 644, FIG. 6) configured to combine the first carrier frequency with a modulated input signal (e.g., $202_{nE}$, FIG. 8) to generate a combined optical signal, the modulated input signal having a second carrier frequency (e.g., $204_{nE}$, FIG. 8) modulated with second data (e.g., $620_1$-$620_2$ of remote 600, FIG. 6); a photodetector (e.g., $650_1$, FIG. 6) configured to convert the combined optical signal into a corresponding electrical signal proportional to an optical power of the combined optical signal; and a signal processor (e.g., 654/660, FIG. 6) configured to process the corresponding electrical signal to recover the second data; and wherein the second carrier frequency is offset with respect to the first carrier frequency by a fixed nonzero frequency offset (e.g., B/2, FIG. 8).

In some embodiments of the above apparatus, the apparatus further comprises a WDM transceiver (e.g., 502, FIG. 5) having a plurality of individual-channel transceivers, wherein the laser, the optical coupler, and the photodetector are parts of a first individual-channel transceiver (e.g., 600, FIG. 6) of the plurality.

In some embodiments of any of the above apparatus, each other individual-channel transceiver of the WDM transceiver comprises a nominal copy of the first individual-channel transceiver, the nominal copy being configured to operate using a different respective first carrier frequency (e.g., selected from laser comb {$204_{nW}$}, FIG. 8) and a different respective second carrier frequency (e.g., selected from laser comb {$204_{nE}$}, FIG. 8).

In some embodiments of any of the above apparatus, respective lasers (e.g., 602, FIG. 6) of the individual-channel transceivers are configured to generate the different respective first carrier frequencies such that a spacing between two adjacent first carrier frequencies alternates between a first value (e.g., $B_{CH}$−0.5B, FIG. 8) and a different second value (e.g., $B_{CH}$+0.5B, FIG. 8).

In some embodiments of any of the above apparatus, a difference between the first value and the second value is a bandwidth (e.g., B, FIG. 8) of the modulated output signal.

In some embodiments of any of the above apparatus, the plurality of individual-channel transceivers are configured to operate using a frequency grid that has a constant channel spacing (e.g., $B_{CH}$, FIG. 8).

In some embodiments of any of the above apparatus, the apparatus further comprises a DEMUX filter (e.g., 580, FIG. 5) having a plurality of pass bands (e.g., $810_n$, FIG. 8), each of the pass bands configured to feed light to a respective one of the individual-channel transceivers, wherein a center frequency of at least one of the pass bands is offset with respect to the respective first carrier frequency.

In some embodiments of any of the above apparatus, the apparatus further comprises a DEMUX filter (e.g., 580, FIG. 5) having a plurality of pass bands (e.g., 810$_n$, FIG. 8), each of the pass bands configured to feed light to a respective one of the individual-channel transceivers, wherein a center frequency of at least one of the pass bands is offset with respect to the respective second carrier frequency.

In some embodiments of any of the above apparatus, each of the plurality of individual-channel transceivers is configured to handle optical signals corresponding to a different respective WDM channel (e.g., CHn, FIG. 8) of the WDM transceiver.

In some embodiments of any of the above apparatus, the apparatus further comprises a DEMUX filter (e.g., 580, FIG. 5) having a plurality of pass bands (e.g., 810$_n$, FIG. 8), each of the pass bands configured to feed light to a respective one of the individual-channel transceivers, wherein a center frequency of at least one of the pass bands is offset with respect to a center of a frequency slot allocated to a corresponding WDM channel.

In some embodiments of any of the above apparatus, the DMUX filter has an operating stability that allows the center frequency of the pass band to drift over time within a fixed frequency interval (e.g., $B_2/2$, FIG. 9) that has a spectral width that is greater than 20% of a bandwidth (e.g., B, FIG. 8) of the modulated input signal.

In some embodiments of any of the above apparatus, the fixed frequency offset is approximately (e.g., to within ±10%) one half of a data bandwidth of the modulated input signal (e.g., B/2, FIG. 8).

In some embodiments of any of the above apparatus, the modulated input signal is a PDM signal (e.g., 552, FIG. 5).

In some embodiments of any of the above apparatus, the optical modulator is further configured to modulate the first carrier frequency to cause the modulated output signal to carry a pilot tone (e.g., 1004, FIG. 10A; 1014, FIG. 10B).

In some embodiments of any of the above apparatus, the apparatus is configured to lock the second carrier frequency with respect to the pilot tone.

In some embodiments of any of the above apparatus, the modulated input signal is configured to carry a pilot tone (e.g., 1004, FIG. 10A; 1014, FIG. 10B).

In some embodiments of any of the above apparatus, the laser is configured to lock the first carrier frequency with respect to the pilot tone.

In some embodiments of any of the above apparatus, the optical coupler comprises an asymmetric 2×2 coupler (e.g., 644$_2$, FIG. 7).

According to yet another example embodiment disclosed above in reference to FIGS. 1-10, provided is an apparatus (e.g., 500, FIG. 5) comprising a first WDM transceiver (e.g., 502$_W$, FIG. 5) and a second WDM transceiver (e.g., 502$_E$, FIG. 5) optically coupled to one another; wherein the first WDM transceiver has a first plurality of individual-channel transceivers (e.g., 600, FIG. 6), each of the individual-channel transceivers of the first plurality having allocated thereto a respective frequency slot (e.g., CHn, FIG. 8) on a frequency grid and configured to transmit data using a respective first carrier frequency, the respective first carrier frequencies being arranged to form a first frequency comb (e.g., $\{204_{nW}\}$, FIG. 8); wherein the second WDM transceiver has a second plurality of individual-channel transceivers (e.g., 600, FIG. 6), each of the individual-channel transceivers of the second plurality having allocated thereto a respective frequency slot on the frequency grid and configured to transmit data using a respective second carrier frequency, the respective second carrier frequencies being arranged to form a second frequency comb (e.g., $\{204_{nE}\}$, FIG. 8); and wherein the first frequency comb and the second frequency comb are offset with respect to one another by a fixed nonzero frequency offset (e.g., B/2, FIG. 8).

In some embodiments of the above apparatus, the individual-channel transceivers are configured to generate the respective carrier frequencies such that, in each of the first and second frequency combs, a spacing between two adjacent carrier frequencies alternates between a first value (e.g., $B_{CH}$–0.5B, FIG. 8) and a different second value (e.g., $B_{CH}$+0.5B, FIG. 8).

In some embodiments of any of the above apparatus, the fixed frequency offset is approximately (e.g., to within ±10%) one half of a data bandwidth (e.g., B/2, FIG. 8) of a modulated signal corresponding to a WDM channel.

In some embodiments of any of the above apparatus, an individual-channel transceiver of the first plurality and a corresponding individual-channel transceiver of the second plurality are configured to operate in a master-slave arrangement to cause the respective first and second carrier frequencies thereof to be frequency locked to one another.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus, comprising:
    a WDM transceiver having a plurality of individual-channel transceivers; and
    a DEMUX filter having a plurality of pass bands, each of the pass bands configured to feed light to a respective one of the individual-channel transceivers;
    wherein a first individual-channel transceiver of the WDM transceiver comprises:
        an optical port connectable to receive a first carrier frequency;
        an optical modulator connected to the optical port and configured to modulate the first carrier frequency with first data to generate a modulated output signal;
        an optical coupler connected to the optical port and configured to combine the first carrier frequency with a modulated input signal to generate a combined optical signal, the modulated input signal having a second carrier frequency modulated with second data;
        a photodetector configured to convert the combined optical signal into a corresponding electrical signal proportional to an optical power of the combined optical signal; and
        a signal processor configured to process the corresponding electrical signal to recover the second data;
    wherein a center frequency of at least one of the pass bands is offset with respect to a center of a frequency slot allocated to a corresponding WDM channel; and
    wherein the second carrier frequency is offset with respect to the first carrier frequency by a fixed nonzero frequency offset.

2. The apparatus of claim 1, wherein each other individual-channel transceiver of the WDM transceiver comprises a nominal copy of the first individual-channel transceiver, the nominal copy being configured to operate using a different respective first carrier frequency and a different respective second carrier frequency.

3. The apparatus of claim 2, wherein respective optical ports of the individual-channel transceivers are connectable to receive the different respective first carrier frequencies generated such that a spacing between two adjacent first carrier frequencies alternates between a first value and a different second value.

4. The apparatus of claim 3, wherein a difference between the first value and the second value is a bandwidth of the modulated output signal.

5. The apparatus of claim 3, wherein the plurality of individual-channel transceivers are configured to operate using a frequency grid that has a constant channel spacing.

6. The apparatus of claim 2, wherein a center frequency of at least one of the pass bands is offset with respect to the respective first carrier frequency.

7. The apparatus of claim 2, wherein a center frequency of at least one of the pass bands is offset with respect to the respective second carrier frequency.

8. The apparatus of claim 1, wherein each of the plurality of individual-channel transceivers is configured to handle optical signals corresponding to a different respective WDM channel of the WDM transceiver.

9. The apparatus of claim 1, wherein the DMUX filter has an operating stability that allows the center frequency of the pass band to drift over time within a fixed frequency interval that has a spectral width that is greater than 20% of a bandwidth of the modulated input signal.

10. The apparatus of claim 1, wherein the fixed frequency offset is approximately one half of a data bandwidth of the modulated input signal.

11. The apparatus of claim 1, wherein the modulated input signal is a PDM signal.

12. The apparatus of claim 1,
    wherein the optical modulator is further configured to modulate the first carrier frequency to cause the modulated output signal to carry a pilot tone; and
    wherein the apparatus is configured to lock the second carrier frequency with respect to the pilot tone.

13. The apparatus of claim 1, further comprising a laser connected to the optical port and configured to apply thereto the first carrier frequency;
    wherein the modulated input signal is configured to carry a pilot tone; and
    wherein the laser is configured to lock the first carrier frequency with respect to the pilot tone.

14. The apparatus of claim 1, wherein the optical coupler comprises an asymmetric 2×2 coupler.

15. An apparatus, comprising:
    a WDM transceiver having a plurality of individual-channel transceivers; and
    a DEMUX filter having a plurality of pass bands, each of the pass bands configured to feed light to a respective one of the individual-channel transceivers;
    wherein a first individual-channel transceiver of the WDM transceiver comprises:
        an optical port connectable to receive a first carrier frequency;

an optical modulator connected to the optical port and configured to modulate the first carrier frequency with first data to generate a modulated output signal;

an optical coupler connected to the optical port and configured to combine the first carrier frequency with a modulated input signal to generate a combined optical signal, the modulated input signal having a second carrier frequency modulated with second data;

a photodetector configured to convert the combined optical signal into a corresponding electrical signal proportional to an optical power of the combined optical signal; and a signal processor configured to process the corresponding electrical signal to recover the second data;

wherein the second carrier frequency is offset with respect to the first carrier frequency by a fixed nonzero frequency offset;

wherein each other individual-channel transceiver of the WDM transceiver comprises a nominal copy of the first individual-channel transceiver, the nominal copy being configured to operate using a different respective first carrier frequency and a different respective second carrier frequency; and wherein a center frequency of at least one of the pass bands is offset with respect to the respective first carrier frequency.

16. An apparatus, comprising:

a WDM transceiver having a plurality of individual-channel transceivers; and a DEMUX filter having a plurality of pass bands, each of the pass bands configured to feed light to a respective one of the individual-channel transceivers;

wherein a first individual-channel transceiver of the WDM transceiver comprises:

an optical port connectable to receive a first carrier frequency;

an optical modulator connected to the optical port and configured to modulate the first carrier frequency with first data to generate a modulated output signal;

an optical coupler connected to the optical port and configured to combine the first carrier frequency with a modulated input signal to generate a combined optical signal, the modulated input signal having a second carrier frequency modulated with second data;

a photodetector configured to convert the combined optical signal into a corresponding electrical signal proportional to an optical power of the combined optical signal; and a signal processor configured to process the corresponding electrical signal to recover the second data;

wherein the second carrier frequency is offset with respect to the first carrier frequency by a fixed nonzero frequency offset;

wherein each other individual-channel transceiver of the WDM transceiver comprises a nominal copy of the first individual-channel transceiver, the nominal copy being configured to operate using a different respective first carrier frequency and a different respective second carrier frequency; and wherein a center frequency of at least one of the pass bands is offset with respect to the respective second carrier frequency.

17. An apparatus, comprising:

a laser connected to an optical port and configured to apply thereto a first carrier frequency;

an optical modulator connected to the optical port and configured to modulate the first carrier frequency with first data to generate a modulated output signal;

an optical coupler connected to the optical port and configured to combine the first carrier frequency with a modulated input signal to generate a combined optical signal, the modulated input signal having a second carrier frequency modulated with second data;

a photodetector configured to convert the combined optical signal into a corresponding electrical signal proportional to an optical power of the combined optical signal; and a signal processor configured to process the corresponding electrical signal to recover the second data;

wherein the second carrier frequency is offset with respect to the first carrier frequency by a fixed nonzero frequency offset;

wherein the modulated input signal is configured to carry a pilot tone; and wherein the laser is configured to lock the first carrier frequency with respect to the pilot tone.

* * * * *